Figures 5, 6, 7:
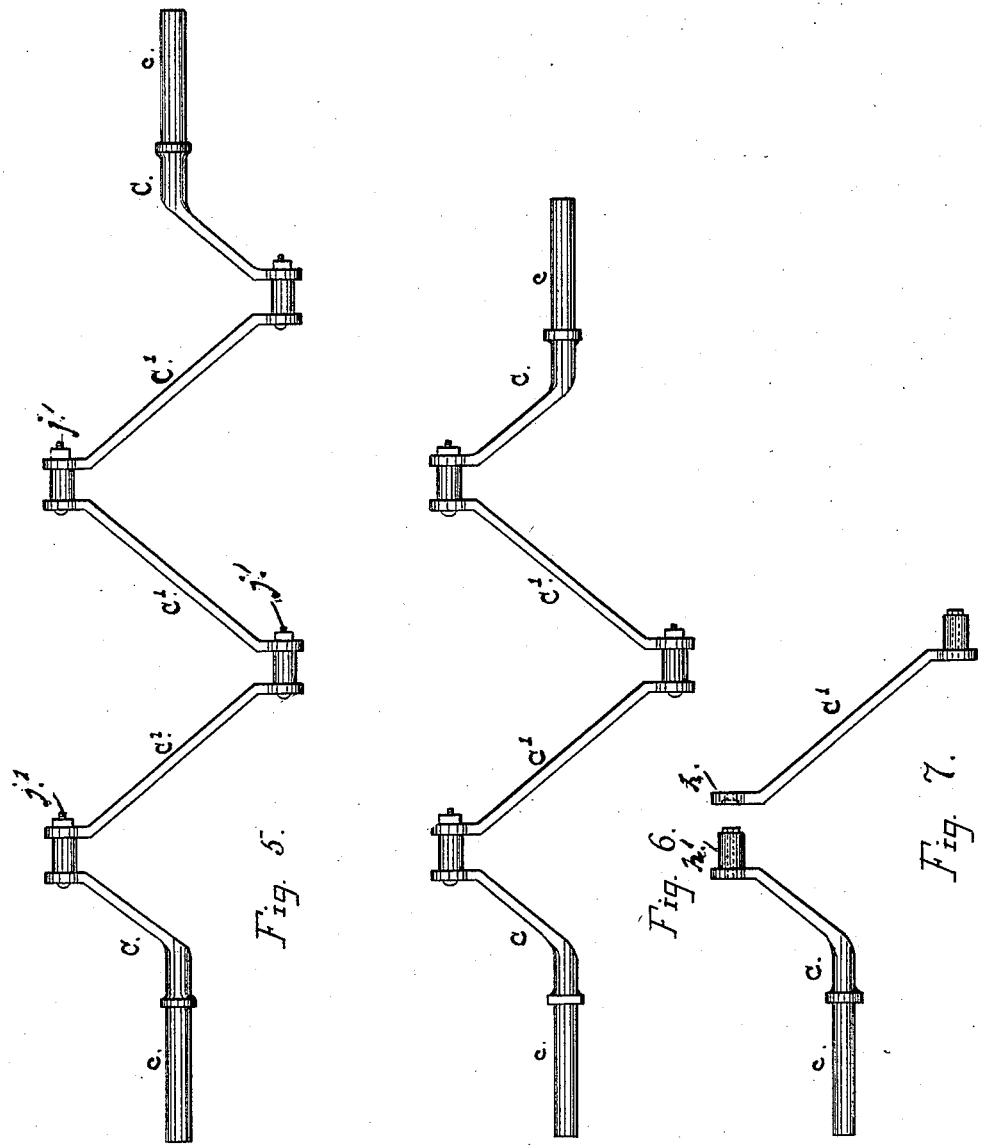

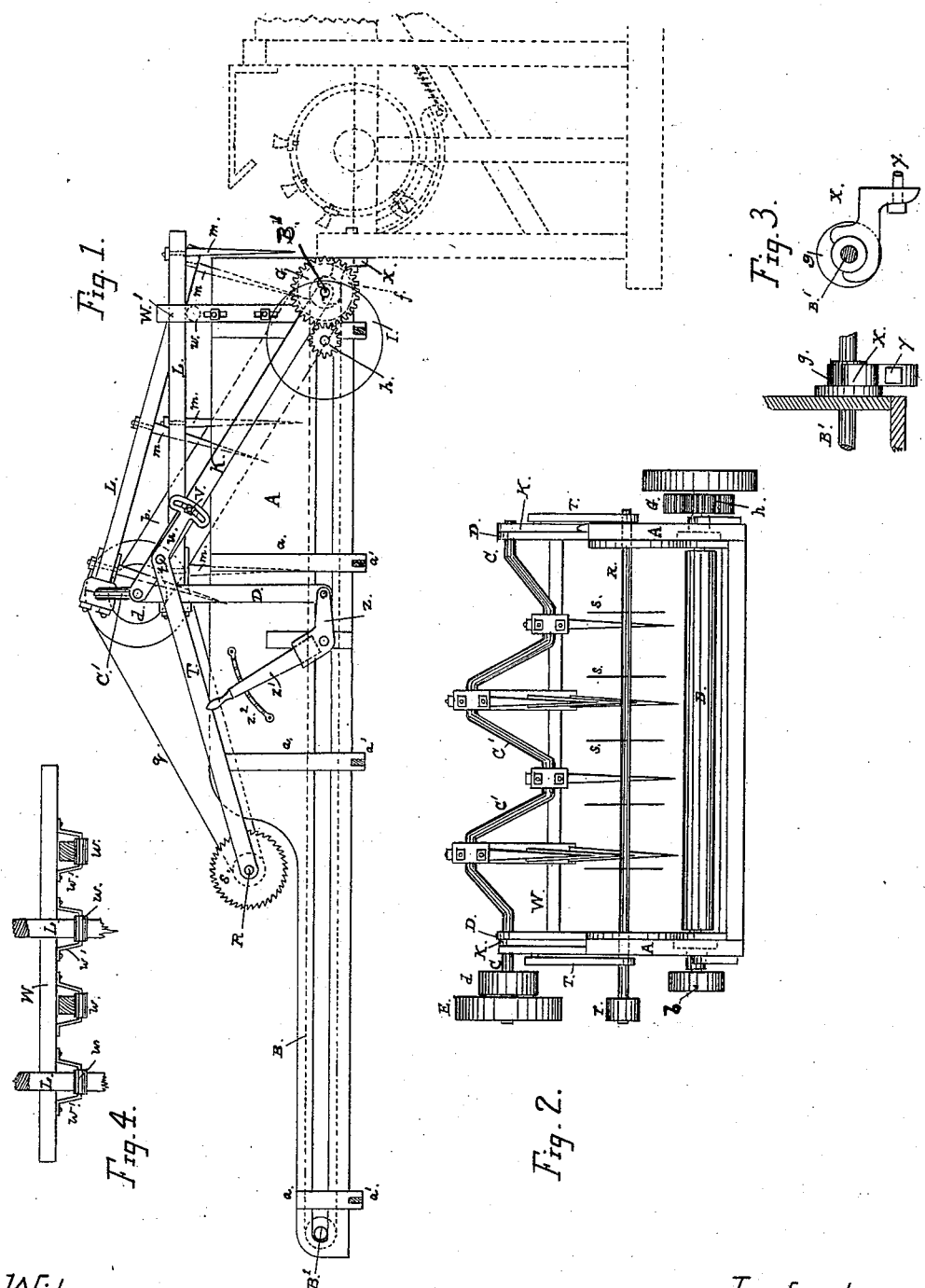

(No Model.) 2 Sheets—Sheet 2.

J. T. WATKINS.
GRAIN SPREADER AND FEEDER FOR THRASHING MACHINES.

No. 306,666. Patented Oct. 14, 1884.

Witnesses.
G. A. Dickson
[signature]

Inventor:
James T. Watkins
By his Atty— [signature]

UNITED STATES PATENT OFFICE.

JAMES T. WATKINS, OF SAN FRANCISCO, CALIFORNIA.

GRAIN SPREADER AND FEEDER FOR THRASHING-MACHINES.

SPECIFICATION forming part of Letters Patent No. 306,666, dated October 14, 1884.

Application filed January 25, 1884. (No model.)

*To all whom it may concern:*

Be it known that I, JAMES T. WATKINS, a citizen of the United States, residing in the city and county of San Francisco, State of California, have made and invented certain new and useful Improvements in Grain Spreader and Feeder for Thrashing-Machines, of which the following is a full, clear, and exact description, the accompanying drawings, forming part of this specification, being referred to by figures and letters.

My invention relates to improvements in mechanical grain-spreaders for thrashing-machines or such devices that are designed to produce a uniform distribution of the stream or moving layer of grain as it enters the cylinder-chamber.

The following description fully explains the nature of my said improvement and the manner in which I proceed to construct, apply, and use the same.

In the drawings referred to, Figure 1 is a side elevation of my improvement as applied directly to the cylinder-chamber of a thrashing-machine to distribute and to feed the grain thereto. Fig. 2 is a view of the receiving end of the feeder. Fig. 3 shows details of one of the brackets for supporting the rear end of the frame, its outer end being held up by the stack from which the grain is supplied. Fig. 4 shows the roller-bearings that support the sliding spreader-bars. Figs. 5, 6, and 7 are views in detail of the extensible crank-shaft.

When placed directly against the end of a thrasher, the attachment takes the place of the usual apron or table that feeds the grain to the cylinder. In this adjustment the delivery end of the frame is supported by two brackets, X, secured to the end uprights of the machine-frame, while the receiving end rests upon the grain-stack. The frame consists of the side pieces, A A, and the bars and cross-slats $a$ $a'$. At either end are provided bearings for a roller, B', and around these two rollers an endless belt or apron, B, extends between the upright sides and from end to end of the frame. This belt constitutes a supporting and carrying surface for the grain, conveying it from the stack forward to and beneath the spreaders and distributers. The front roller is rotated from a pulley geared into the roller-shaft and pulley I, driven from the beater-shaft by a belt. This gearing is used in order to run the apron from the beater-shaft as well as to reduce the rate of motion. At each side of the frame is an upright bar, D, held in vertical position by an inclined radius-bar, K, and having its lower end connected by a pin to the end of an elbow-lever, Z. The handle of this lever engages with a notched segment-bar to confine it in position, and by changing the position of this lever up or down the upper end of the bar D is changed accordingly. The inclined bar is attached by a pivot at one end to the bar D, and at the lower end to a point at or near the roller-shaft B'. This pair of bars D D carry the end of a crank-shaft, C C, and support it horizontally over the apron at a height which is regulated by the lever Z. The crank-shaft has a number of cranks set in alternate order opposite to one another, and each one carries the end of a bar, E, which is provided with a number of long teeth or points, $m$ $m$. These spreader-bars are arranged longitudinally over the grain-carrying surface side by side at equal distances apart, and one to each crank. Their delivery ends are supported by depending brackets $w'$, provided with roller-bearings $w$, and secured to the lower side of a transverse bar, W, which runs across the top of the frame and is supported between upright slats W' W' on the outside. These slats are adjustable vertically by means of bolts and slots, so that the bearings for the delivery ends of the spreader-bars L, as well as the crank-supports of the receiving end, can be set up or down to regulate the distance of the bars L from the grain-carrying surface. The distance of penetration of the points into the grain is thus placed under control, and can be adjusted as required. Rotation of the cranks C C is produced from the pulley $b$ to the pulley $d$ by a belt, $p$, (seen in Fig. 1,) and the motion thus imparted operates the spreader-bars L with a movement that contains both the reciprocating motion due to the roller-bearings through which the bars slide and the rotary, oscillating, or rocking motion due to the crank. By these compound movements the forward end of each bar is depressed, and its tooth or point brought into the grain beneath as the bar is thrown forward, while at the same time that portion of the bar behind the roller or center of oscillation w is elevated. By the movement of the crank the bar is then brought to the horizontal position, which elevates the forward end above the grain, but brings the points in rear of the center w into engagement with the grain beneath them. This motion and action is true of all the bars, excepting that they act alternately, one being up and the next adjacent one being down or in opposite position. The points at the front ends of the bars therefore act on the grain in a forward direction, but those behind the roller-bearings, in a direction backward or against the travel of the grain. The result of this is to pull apart, spread out, and distribute the grain in an even layer on the forward end of the apron, so that it is introduced into the cylinder in a sheet of uniform density, or as nearly as possible of equal depth. The number of these spreader-bars to be used is governed by the size of the machine, as well as by the character of the grain or substance being acted upon, as in certain conditions of work more bars and points may be required than in other conditions and applications of the device. To change the number of these bars, I employ and provide an extensible crank-shaft composed of removable sections or portions, and capable of being increased or diminished in number of cranks as desired. The construction of this extensible crank is shown in Figs. 5, 6, and 7 of the drawings.

C C are end portions carrying the journals c, and C' are intermediate sections, each one having an eye, h, at one end, and a collar or short cylindrical portion, h', forming the crank-pin at the opposite end with a hole for a through-bolt, j'. The straight portion C', between these two parts, is set at an angle, which governs the space between the cranks. The eye on the end of one section is adapted to take in the end of the cylindrical portion of the other section, and by setting together as many of these sections as are required to give the proper number of cranks, a continuous crank-shaft is produced. The ends c of the outer sections form the spindles or journals. Fig. 5 shows such a crank-shaft with four cranks, and Fig. 6 a shaft with three cranks.

This construction is of particular advantage to farmers and others using the invention, as it enables repairs to the shaft to be easily made. A broken or twisted part can be taken out and a new section substituted for it, and the same metal-work of the attachment can be used and adapted to different sizes of machines, for the frame and other wooden parts can be made and put together by an ordinary workman. A band-cutter, consisting of a shaft, R, with a number of circular cutters, S S, is fixed across the frame above the grain-carrier. It is driven from a pulley on the crank-shaft by means of a belt carried around a small pulley, r, as seen in Fig. 2, and the ends of the shaft are fixed in swinging bearings formed in bars T T, which are pivoted at t to the inclined bars K, each one having a short arm or extension, u, on the opposite side of the pivot, which is attached to the side of the bar K by a bolt and nut taking through a curved slot in the arm and into the bar. This fastening affords adjustment of the outer end of the bars T by which the cutters are set up or down to bring them into proper working relation with the grain beneath. Now, as thus constructed, my improved attachment is supported at the delivery end by the brackets X, secured to the frame of the thrasher, while the receiving end rests upon the grain-stack and drops down with it. Where it is applied to a machine using a feed-belt, the delivery end of the frame will be opened and will be attached at the side of the feeder and near the receiving end, so that it shall work at right-angles to the direction of the feed-belt; but where it is applied as shown in the drawings the bars operate both as distributers and feeders, for the teeth or points in the ends of the bars next the cylinder act to throw the grain forward evenly and regularly from the end of the apron B into the cylinder-chamber.

Having thus fully described my invention, what I claim, and desire to secure by Letters Patent, is—

1. The herein-described grain spreading and distributing attachment for thrashing-machines, comprising the endless traveling apron, the carrying-rollers, a crank-shaft mounted horizontally over the apron and having cranks set alternately and diametrically opposite to one another, the spreader-bars having depending points and attached to the cranks, and the sliding bearings that permit the free ends of the bars to move longitudinally as well as to rock therein, substantially as set forth.

2. The combination, with the traveling carrier, of the crank-shaft, the spreader-bars connected thereto, roller-bearings therefor at their front or free ends, and means for imparting rotation to the crank-shaft, substantially as described.

3. The combination, with the crank-shaft, of the vertically-adjustable bars D, which support said shaft, the elbow-levers Z, pivoted to said adjustable bars D and to a fixed part, whereby the said bars are elevated or lowered, and the inclined radius-bars K, to which the bars D are secured and by which they are held in an upright position, as set forth.

4. In a grain-distributing attachment for thrashing-machines, the combination of the frame, the crank-shaft, a pulley on said shaft, and the series of longitudinal spreader-bars having depending teeth, and roller-bearings supporting said bars at their free ends, substantially as set forth.

5. The crank-shaft formed of separate pieces or sections, the outer ones of which have journal portions and the others an eye at one end and a collar or projecting cylindrical part on the other end to form a crank-pin, which sections are removable and interchangeable, in combination with the spreader-bars and supports therefor at their free ends, substantially as described.

6. The sectional crank formed of independent removable parts or sections, and capable of contraction and expansion, in combination with the spreader-bars, substantially as described.

JAMES T. WATKINS. [L. S.]

Witnesses:
JNO. L. TAGGARD,
EDWD. E. OSBORN.